United States Patent [19]
Zhang

[11] Patent Number: 5,745,195
[45] Date of Patent: Apr. 28, 1998

[54] LIQUID CRYSTAL ELECTROOPTICAL DEVICE

[75] Inventor: Hongyong Zhang, Kanagawa, Japan

[73] Assignee: Semiconductor Energy Laboratory Co., Ltd., Kanagawa-ken, Japan

[21] Appl. No.: 646,511

[22] Filed: May 7, 1996

[30] Foreign Application Priority Data

May 7, 1995 [JP] Japan ................................ 7-134835

[51] Int. Cl.$^6$ .................................................. G02F 1/1343
[52] U.S. Cl. .................................. 349/39; 349/38
[58] Field of Search .......................... 349/42, 43, 39, 349/51, 38

[56] References Cited

U.S. PATENT DOCUMENTS

| | | | |
|---|---|---|---|
| 4,829,358 | 5/1989 | Yamazaki | 349/43 |
| 5,182,661 | 1/1993 | Ideda et al. | 349/42 |
| 5,289,174 | 2/1994 | Suzuki | 349/39 |
| 5,321,535 | 6/1994 | Ukai et al. | 349/39 |
| 5,365,079 | 11/1994 | Kodaira et al. | 349/43 |
| 5,418,636 | 5/1995 | Kawasaki | 349/43 |
| 5,483,366 | 1/1996 | Atherton | 349/42 |
| 5,517,342 | 5/1996 | Kim et al. | 349/43 |

*Primary Examiner*—William L. Sikes
*Assistant Examiner*—Tiep H. Nguyen
*Attorney, Agent, or Firm*—Fish & Richardson P.C.

[57] ABSTRACT

An active matrix liquid crystal display having auxiliary capacitors. Two transparent conductive layers of ITO are formed on opposite sides of an insulating film. The first conductive layer forms pixel electrodes. The second transparent conductive film overlaps at least parts of the pixel electrodes via the insulating film to form the auxiliary capacitors without deteriorating the aperture ratio of the pixels.

14 Claims, 2 Drawing Sheets

LIQUID CRYSTAL ELECTROOPTICAL DEVICE

FIELD OF THE INVENTION

The present invention relates to a pixel region structure for use in an active matrix liquid crystal display and, more particularly, to the structure of auxiliary capacitors connected in parallel with pixel electrodes.

BACKGROUND OF THE INVENTION

Active matrix liquid crystal displays (AMLCDs) are known. In such a liquid crystal display, at least one thin-film transistor (TFT) is connected with a number of pixel electrodes. This TFT controls electric charges going into and out of the pixel electrodes.

A pixel electrode is disposed on the opposite side of a liquid-crystal layer from a counter electrode. These pixel electrode and counter electrode together form a capacitor. The TFT acts as a switching device for forcing electric charges to go into and out of this capacitor.

During actual operation, however, the capacitance created by this pixel electrode portion is so small that it is necessary to provide an auxiliary capacitor. Where the capacitors are constructed from a conductive material such as a metal material, it follows that a light-blocking portion exists inside the pixel, thus lowering the aperture ratio. Especially, if the value of the auxiliary capacitor is increased, the aperture ratio of the pixels drops.

SUMMARY OF THE INVENTION

It is an object of the present invention to provide a liquid crystal electrooptical device in which auxiliary capacitances are increased without lowering the aperture ratio of pixels.

A liquid crystal electrooptical device according to the present invention comprises a first transparent conductive film forming pixel electrodes and a second transparent conductive film overlapping at least parts of the pixel electrodes via an insulating film. The first transparent conductive film, the second transparent conductive film, and the intervening insulating film together form auxiliary capacitors.

An example of this structure is shown in FIGS. 1 and 2, where a first transparent conductive film 117 of ITO forms pixel electrodes. A second transparent conductive film 115 disposed opposite to the pixel electrodes 117 cooperates with the pixel electrodes 117 to form auxiliary capacitors. Since the first transparent conductive film, the second transparent conductive film, and an intervening insulating film 116 together form capacitors, it is necessary that the first and second conductive films overlap each other at least partially.

The material of the transparent conductive films used in the present invention can be $SnO_2$, as well as ITO. Furthermore, materials consisting principally of $SnO_2$ or ITO may also be employed.

The second electrode layer disposed opposite to the pixel electrodes to form the auxiliary capacitors is a transparent conductive film and so the aperture ratio of the pixels is prevented from deteriorating. This makes it possible to secure required capacitance. Moreover, as shown in FIG. 1, the pixel electrodes 117 and the transparent conductive film 115 are separated from each other only by the interlayer dielectric film 116 and, therefore, capacitors having great capacitance values can be formed between them.

Other objects and features of the invention will appear in the course of the description thereof, which follows.

DETAILED DESCRIPTION OF THE INVENTION

Figure 1:
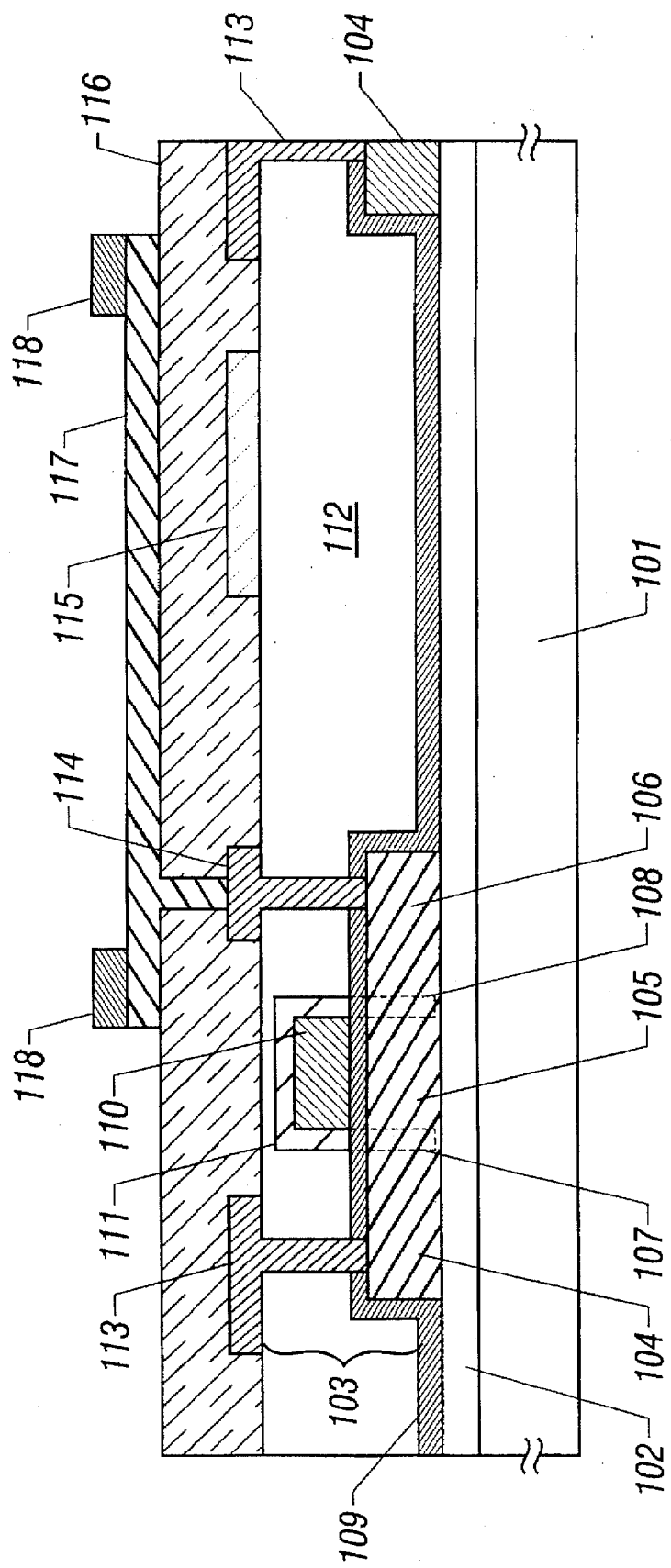
FIG. 1 is a fragmentary cross-sectional view of an active matrix liquid crystal display according to the invention, showing its one pixel region.
Figure 2:
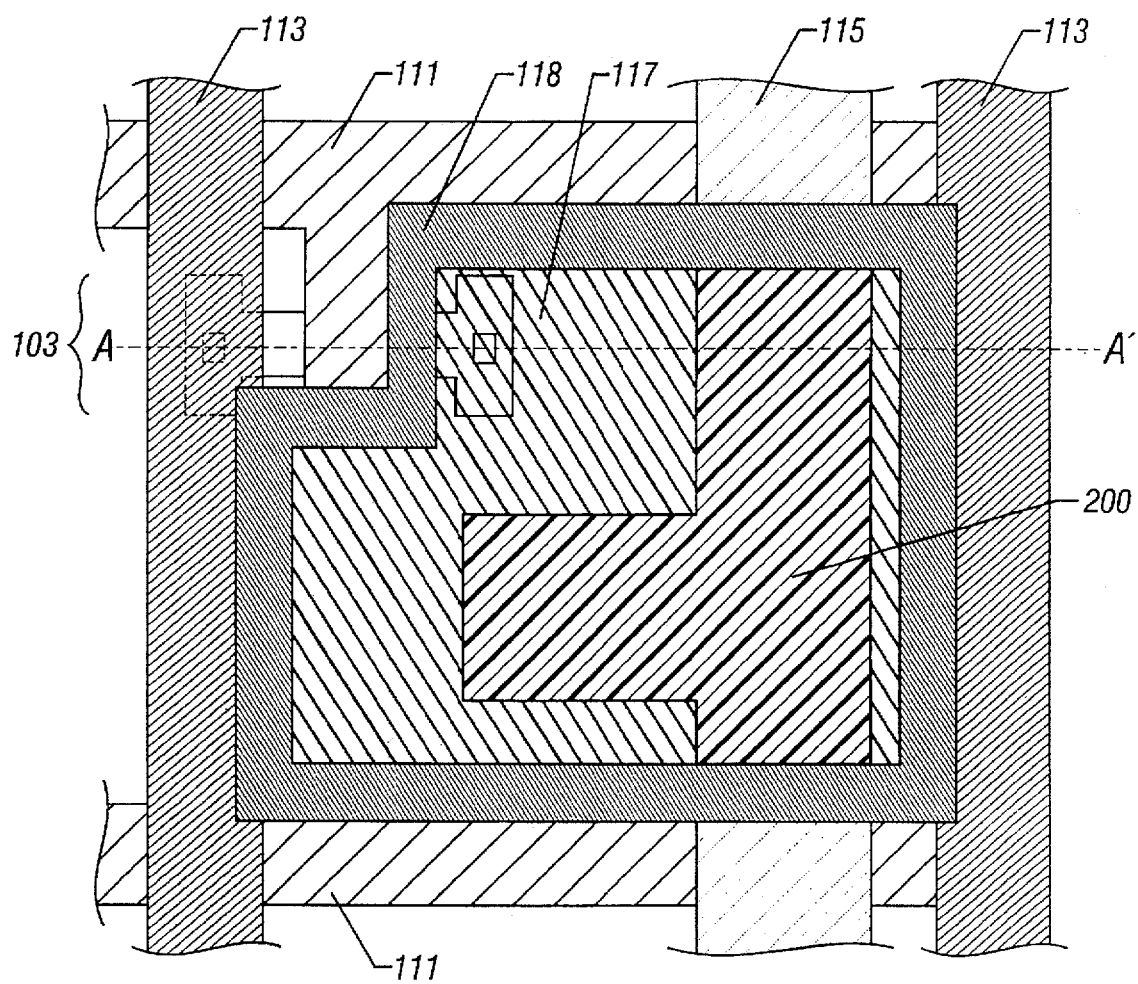
FIG. 2 is a fragmentary top view of the liquid crystal display shown in FIG. 1.

Referring to FIGS. 1 and 2, there is shown an active matrix liquid crystal display embodying the concept of the present invention. FIG. 1 is a cross section taken on line A–A' of FIG. 2. In FIGS. 1 and 2, the state of one of pixels forming the pixel regions of the active matrix liquid crystal display is shown. Of the two substrates, the substrate on which TFTs are formed is shown. In practice, the counter substrate also exists. A liquid crystal material is held in the gap of several micrometers between the counter substrate (not shown) and the substrate shown in FIG. 1.

In FIGS. 1 and 2, a thin-film transistor (TFT) is formed in a portion 103. A glass substrate is indicated by 101. Instead of the glass substrate, a quartz substrate may be used. A silicon oxide film 102 forms a buffer film on the glass substrate 101. An active layer constituting the TFT is formed by regions 104, 105, 106, 107, and 108. These regions 104–108 of the active layer are formed by heating an amorphous silicon film or by irradiating it with laser light so as to crystallize it.

This active layer has the source region 104, the offset gate regions 107, 108, the channel formation region 105, and the drain region 106.

A silicon oxide film 109 acts as a gate-insulating film. A gate electrode 110 consists mainly of aluminum. An anodic oxide film 111 is formed by carrying out an anodization process, using aluminum as an anode. The gate electrode 110 extends from gate lines coated with the anodic oxide film 111 (FIG. 2). A first interlayer dielectric film 112 is made of a silicon oxide film. Electrodes 113 are brought out from the source region 104 and extends from the source lines 113 shown in FIG. 2. Another electrode 114 is brought out from the drain region 106 and connected to the pixel electrodes 117 of ITO.

Auxiliary electrodes are formed between electrodes 115 and the pixel electrodes 117 of ITO. The electrodes 115 are also made of a transparent conductive film of ITO. A second layer of interlayer dielectric film 116 exists between the layer of the pixel electrodes 117 and the transparent conductive film 115 to form the auxiliary capacitors.

A black color matrix 118 is made of titanium and arranged to cover parts of the multilayer structure of pixel electrodes 117 and source lines 113, as well as parts of the multilayer structure of pixel electrodes 117 and gate lines (coated with the anodic oxide film 111 in FIG. 2).

In FIG. 2, the source lines 113 in adjacent columns are shown. In the actual configuration, source lines and gate lines are arranged in rows and columns. Each area surrounded by the source and gate lines forms a pixel as shown in FIG. 2.

The electrodes 115 shown in FIGS. 1 and 2 are arranged to intersect the pixels. That is, the number of the electrodes 115 is equal to the number of the source lines 113. The electrodes 115 are placed at a common potential. The electrodes 115 and the pixel electrodes 117 together form the auxiliary capacitors.

Since the electrodes 115 are made of a transparent conductive film, even if they overlap considerable portions 200 of the pixel electrodes 117, the aperture ratio of the pixels is not low. That is, the required capacitance can be obtained without deteriorating the aperture ratio.

In the present invention, electrodes disposed opposite to pixel electrodes forming auxiliary capacitors are made of a transparent conductive film. Consequently, the auxiliary capacitance can be increased without sacrifice of the aperture ratio.

What is claimed is:

1. An electrooptical device comprising:

a transistor;

a first transparent conductive film forming a pixel electrode for forming a pixel;

an insulating film; and a second transparent conductive film disposed on the opposite side of said insulating film from said first transparent conductive film and overlapping at least a part of said pixel electrode with said insulating film to provide an auxiliary capacitor comprising said second transparent conductive film, said insulating film and said pixel electrode.

wherein said transistor and said auxiliary capacitor are provided on the same substrate, and a gate and a channel region of said transistor are on different planes from said auxiliary capacitor.

2. The device of claim 1 wherein said electrooptical device is an active matrix liquid crystal display.

3. The device of claim 1 wherein said transparent conductive films are made of ITO.

4. The device of claim 1 wherein said transparent conductive films are made of SnO$_2$.

5. The device of claim 1 further comprising a pixel capacitor provided in parallel with corresponding one of said auxiliary capacitors and comprising an electro-optical modulating layer provided between the corresponding one of said pixel electrodes and a counter electrode provided on an opposite side of said electro-optical modulating layer from said pixel electrodes.

6. The device of claim 5 wherein said electro-optical modulating layer comprises a liquid crystal.

7. The device of claim 1 further comprising a thin film transistor comprising a source and drain and a channel provided between said source and said drain wherein said drain is connected with corresponding one of said pixel electrodes.

8. The device of claim 7 wherein said thin film transistor further comprising offset gate regions each provided between said channel and corresponding one of said source and said drain.

9. The device of claim 7 wherein said thin film transistor and said pixel electrodes are provided in an active matrix.

10. The device of claim 7 wherein said source and said drain and said channel are provided in a crystalline silicon film.

11. A device as in claim 1 wherein said pixel electrode is operatively associated with said transistor.

12. An electrooptical device comprising:

a transistor;

an interlayer insulating film provided over a gate and a channel region of said transistor;

a first transparent conductive film forming a pixel electrode for forming a pixel;

a dielectric film; and a second transparent conductive film disposed on the opposite side of said dielectric film from said first transparent conductive film and overlapping at least a part of said pixel electrode with said dielectric film being between said first and second conductive film to provide an auxiliary capacitor comprising said second transparent conductive film, said dielectric film and said pixel electrode, wherein said transistor and said auxiliary capacitor are provided on the same substrate, and said auxiliary capacitor is provided on said interlayer insulating film.

13. A device as in claim 12 wherein said pixel electrode is operatively associated with said transistor.

14. An electrooptical device comprising:

a plurality of horizontally-extending material layers, including:

a first plurality of layers forming a transistor;

an interlayer insulating film provided vertically above a gate and a channel region of said transistor;

a first transparent conductive film layer, provided vertically above said transistor, and forming a pixel electrode for forming a pixel;

a capacitive film layer, vertically above said transistor and adjacent said first transparent layer; and a second transparent conductive film disposed vertically above said transistor and on the opposite side of said capacitive film layer from said first transparent conductive film and overlapping at least a part of said pixel electrode with said capacitive film layer being between said first and second conductive films to provide an auxiliary capacitor comprising said second transparent conductive film, said capacitive layer and said pixel electrode, wherein said transistor and said auxiliary capacitor are provided coupled to the same substrate, and said auxiliary capacitor is provided on a vertically different plane from said transistor.

* * * * *